US009881320B2

(12) United States Patent
Alsina et al.

(10) Patent No.: US 9,881,320 B2
(45) Date of Patent: Jan. 30, 2018

(54) TARGETING CUSTOMER SEGMENTS

(71) Applicant: Apple Inc., Cupertino, CA (US)

(72) Inventors: Thomas Alsina, Mountain View, CA (US); David T. Wilson, Campbell, CA (US); Sagar A. Joshi, San Jose, CA (US); Subash Sundaresan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 549 days.

(21) Appl. No.: 14/289,118

(22) Filed: May 28, 2014

(65) Prior Publication Data
US 2015/0348102 A1 Dec. 3, 2015

(51) Int. Cl.
G06Q 30/02 (2012.01)

(52) U.S. Cl.
CPC .................. G06Q 30/0255 (2013.01)

(58) Field of Classification Search
CPC ....................................................... G06Q 30/00
See application file for complete search history.

(56) References Cited

U.S. PATENT DOCUMENTS

| 6,128,663 | A | 10/2000 | Thomas |
| 6,308,203 | B1 | 10/2001 | Itabashi et al. |
| 7,225,460 | B2 | 5/2007 | Barzilai et al. |
| 7,293,294 | B2 | 11/2007 | Ukai |
| 7,551,913 | B1 | 6/2009 | Chien |
| 7,630,986 | B1 | 12/2009 | Herz et al. |
| 7,788,271 | B2 | 8/2010 | Soma |
| 7,913,291 | B2 | 3/2011 | Yeung et al. |
| 8,086,487 | B2 | 12/2011 | Bistriceanu et al. |
| 8,254,892 | B2 | 8/2012 | Chien |
| 8,307,006 | B2 | 11/2012 | Hannan |

(Continued)

FOREIGN PATENT DOCUMENTS

| EP | 2341479 | 7/2011 |
| WO | 2009/087613 | 7/2009 |

OTHER PUBLICATIONS

International Search Report and Written Opinion from PCT Application No. PCT/US2013/041890 dated Oct. 9, 2013.

(Continued)

Primary Examiner — Eric R Netzloff
(74) Attorney, Agent, or Firm — Polsinelli PC

(57) ABSTRACT

Systems, methods, and computer-readable storage media for targeting segments of customers. A system maps users to targeting segments based on a respective purchase history of the users, and receives a segment identifier from a server, the segment identifier to be associated with a targeting segment from the targeting segments for anonymously identifying the targeting segment. Next, the system associates the segment identifier with the targeting segment and users mapped to the targeting segment, and sends, to the server, the segment identifier and unique user identifiers of the users mapped to the targeting segment associated with the segment identifier, the unique user identifiers masking respective identities of the users from the server and the segment identifier masking an identity of the targeting segment associated with the segment identifier. The system then instructs the server to deliver selected invitational content to at least one unique user identifier associated with the segment identifier.

25 Claims, 6 Drawing Sheets

(56) References Cited

U.S. PATENT DOCUMENTS

| | | | |
|---|---|---|---|
| 8,364,969 B2 | 1/2013 | King | |
| 8,369,834 B2 | 2/2013 | Rozensztejn | |
| 8,387,108 B1 | 2/2013 | Satish et al. | |
| 8,504,411 B1 | 8/2013 | Subasic | |
| 8,516,550 B2 | 8/2013 | Willars | |
| 8,521,594 B1* | 8/2013 | Skoe | G06Q 30/02 705/14.66 |
| 8,577,806 B2 | 11/2013 | Kuehr-McLaren et al. | |
| 8,627,403 B1 | 1/2014 | Kirshenbaum et al. | |
| 8,775,391 B2* | 7/2014 | Kalavade | G06Q 30/0267 705/74 |
| 2002/0059387 A1 | 5/2002 | Wolfe | |
| 2005/0102155 A1 | 5/2005 | Kuehr-McLaren | |
| 2006/0026067 A1 | 2/2006 | Nicholas et al. | |
| 2008/0123843 A1 | 5/2008 | Machani | |
| 2009/0070412 A1 | 3/2009 | D'Angelo et al. | |
| 2009/0129377 A1* | 5/2009 | Chamberlain | G06Q 30/0201 370/389 |
| 2010/0199089 A1 | 8/2010 | Vysogorets | |
| 2010/0228617 A1 | 9/2010 | Ransom et al. | |
| 2010/0229224 A1 | 9/2010 | Etchegoyen | |
| 2011/0060649 A1 | 3/2011 | Dunk | |
| 2011/0060905 A1* | 3/2011 | Stack | G06Q 10/10 713/167 |
| 2011/0106610 A1 | 5/2011 | Landis | |
| 2012/0041792 A1* | 2/2012 | Priyadarshan | G06Q 30/0251 705/5 |
| 2012/0066757 A1 | 3/2012 | Vysogorets | |
| 2012/0102008 A1 | 4/2012 | Kaarianinen | |
| 2012/0215793 A1* | 8/2012 | Arsenault | G06F 17/30011 707/749 |
| 2012/0254320 A1 | 10/2012 | Dove | |
| 2012/0254949 A1 | 10/2012 | Mikkonen | |
| 2012/0271860 A1 | 10/2012 | Graham et al. | |
| 2013/0054628 A1 | 2/2013 | Meierhoefer | |
| 2013/0124309 A1 | 5/2013 | Traasdahl et al. | |
| 2013/0138506 A1 | 5/2013 | Zhu | |
| 2013/0238745 A1 | 9/2013 | Ramachandran et al. | |
| 2013/0297422 A1 | 11/2013 | Hunter et al. | |
| 2013/0326007 A1 | 12/2013 | Turner | |

OTHER PUBLICATIONS

International Preliminary Report on Patentability from PCT Application No. PCT/US2013/041890 dated Dec. 18, 2014.

Manuel Egele et al., "PiOS: Detecting Privacy Leaks in iOS Applications", NDSS, Jan. 1, 2011 (Jan. 1, 2011), XP055082035, Retrieved from the Internet: URL:http:ffwww.syssec-project.eu/m/page-media/3/egele-ndss11.pdf retrieved on Oct. 1, 2013.

Alex Heath, "What is a UDID and Why is Apple Killing Apps That Track Them?", May 20, 2012 (May 20, 2012), XP055082187, Retrieved from the Internet: URL: http://web.archive.org/web/20120520141536/http://www.cultofmac.com/160248/what-the-hell-is-a-udid-and-why-is-apple-worries-about-them-feature/2/, [retrieved on Oct. 2, 2013].

Alex Heath, "What is a UDID and Why is Apple Killing Apps That Track Them?", Apr. 19, 2012, pp. X-X, URL: http://web.archive.org/web/20120419015440/http://www.cultofmac.com/160248/what-the-hell-is-a-udid-and-why-is-apple-worried-about-them-feature/, [retrieved on Oct. 2, 2013].

* cited by examiner

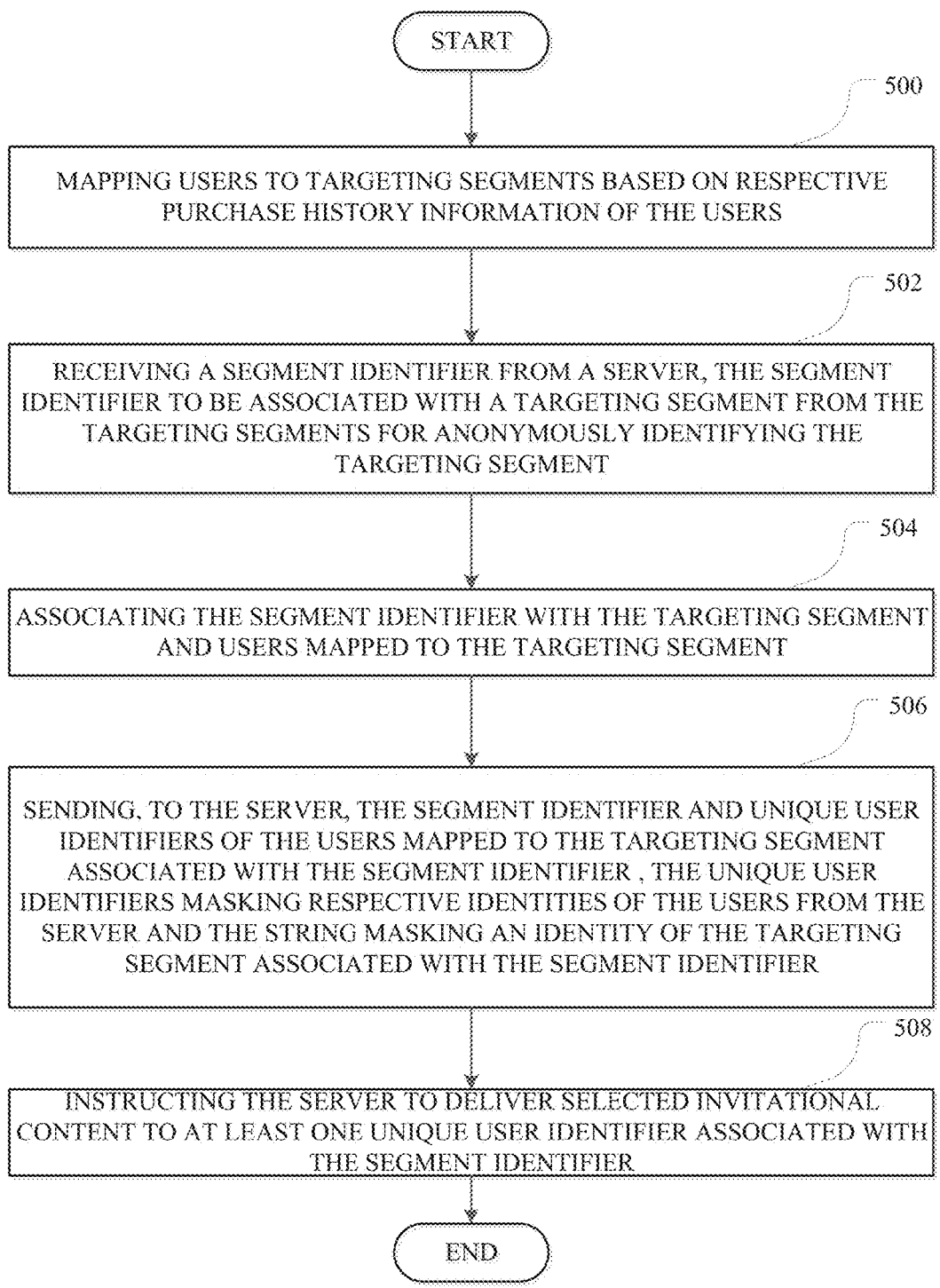

TARGETING CUSTOMER SEGMENTS

TECHNICAL FIELD

The present technology pertains to invitational content, and more specifically pertains to targeting segments of customers without disclosing user information.

BACKGROUND

Digital advertising, including mobile advertising, is widely used by businesses to market their products. Given the widespread availability of computing devices, digital advertising can be an extremely effective way for a business to reach a wide mass of potential customers and induce numerous users to purchase their products. By targeting users with effective advertisements, businesses can yield large financial returns from their advertisements.

To effectively target the right users with the right advertisements, current solutions generally collect and analyze user information, such as user purchasing histories, user identity and profile information, and other information that can provide descriptive information about the user. Moreover, current solutions collect such information about a user or segment to modify an advertisement campaign based on this information about the user or segment. This can allow businesses and advertisers to better target their advertisements, and modify the presentation parameters of their advertisements for better performance.

However, this use of private user information by the current solutions often creates privacy concerns for the user, as users are largely uncomfortable with their private information being collected, analyzed, and even shared beyond their knowledge and control. In fact, many users are even opposed to the sharing of the user's personal information that often takes place in current marketing and advertising schemes. Yet unfortunately, current solutions lack effective mechanisms for protecting the user's privacy when targeting users, and often share and disseminate private user information beyond the particular user's own control, knowledge, or even approval.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can allow a business to use an advertising system or company to target content to the business's customers without sharing personal and private customer information with the advertising system or company. In particular, a business can collect and analyze information associated with their customers, such as purchasing history and habits, to segment their customers for better targeting. The business can then assign a string to each segment of users and identify the customers using unique user identifiers generated by the user's own devices, and simply share the random string and unique user identifiers with the advertising system or company, without exposing or sharing the actual identity of the segments or users to the advertising system or company, or any other party that obtains possession of the shared information. Thereafter, the business can signal or instruct the advertising system or company to deliver advertising content to the unique user identifiers associated with the string, in order to control the targeting of segments of the business' customers without exposing the customer's private information, as previously mentioned. This way, the business can effectively target advertising content to its customers while concealing the customer's and segment's real identity, by masking such personal information using the random string.

Disclosed are systems, methods, and computer-readable storage media for targeting segments of customers. A system can map users to targeting segments based on respective purchase history information of the users. The users can also be mapped to the targeting segments based on one or more additional factors, such as user profiles, demographics, user characteristics, location information, campaign information, user preferences, user context, user activity, etc.

Further, the system can receive one or more segment identifiers from a server. The segment identifiers can be used in associating one or more targeting segments from the targeting segments with the segment identifiers for anonymously identifying the one or more targeting segments with the segment identifiers. To this end, the system can associate the segment identifiers with the targeting segments and users mapped to the targeting segments. The segment identifiers can be strings, such as private strings provided by the server to the system, random strings, etc. In some cases, the strings can be a set of segment identifiers generated by the server for the system, and identified by the server as belonging to the system to avoid any strings in the set of segment identifiers from being distributed to another business or device. Moreover, in some cases, the system can request a number of segment identifiers from the server based on the number of targeting segments identified by the system. The system can then receive the number of segment identifiers requested from the server. As discussed herein, the server can be an advertising or content delivery system, for example.

Next, the system can send, to the server, the segment identifiers and unique user identifiers of the users mapped to the targeting segments associated with the segment identifiers. Here, the unique user identifiers (UUIDs) can mask from the server the respective identities of the users and the identity of the targeting segments associated with the segment identifiers. The UUIDs can be generated by the user's own devices to hide the real identity of the users from the system and/or the server. For example, a user's smartphone can generate a UUID to represent the user. Here, the UUID can be an identifier and may not include the user's actual private information, such as the user's real identity, in order to represent the user while protecting the user's privacy. The smartphone can then send the UUID to the system, and the system can know the user by the UUID created by the user's device. The system can associate the user's UUID with the user's device, so the system or any other device can use the UUID to target content to the user by sending the content to the user's device, without knowing the actual, real identity of the user. The system can then send the UUID to the server as previously described.

After sending the UUIDs and the segment identifiers, the system can then instruct the server to assemble or deliver invitational content to the UUIDs associated with the segment identifiers. The system can provide instructions for assembling and delivering a specific content item for the segment associated with the segment identifier, without disclosing the identity of the segment, or rather select a content item and instruct the server to deliver the selected content item to target the segment identifier. In some cases, the system can also deliver a campaign to the server and instruct the server to deliver invitational content to the UUIDs associated with the segment identifier based on the campaign parameters. To this end, the system can use the segment identifier to target invitational content to one or more users in the targeting segment.

As previously mentioned, in some configurations, the system can send a request to the server to deliver invitational content to a segment represented by the segment identifier. The server can then deliver the invitational content to the segment based on the request, without knowing the identity of the segment or the users in the segment. The request can be sent to the server in response to a triggering event. The triggering event can be, for example, a user action or behavior, a date, a time, a user context, a user location, an estimated user interest, a campaign, a sale, a promotion, a condition, etc.

As previously mentioned, the system can select the invitational content to be delivered to a segment associated with a segment identifier. For example, the system can select a content item based on a characteristic of the segment, user behavior, a user context, campaign information, etc. However, in some cases, the system can also instruct the server how to select the invitational content, or a portion of content, it delivers to a segment identifier, or how to deliver the invitational content. Further, the system can be a device associated with a business or organization, and the users can include customers, subscribers, etc.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an exemplary method embodiment; and

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for accurate and efficient targeting of content to customers while protecting customer privacy. Disclosed are systems, methods, and non-transitory computer-readable storage media for targeting invitational content to customers without sharing personal information about the customers. A brief introductory description of an exemplary configuration of devices and a network is disclosed herein. A detailed description of targeting invitational content to customers and masking private customer information, as well as exemplary variations, will then follow. These variations shall be described herein as the various embodiments are set forth. The disclosure now turns to FIG. 1.

Figure 1:
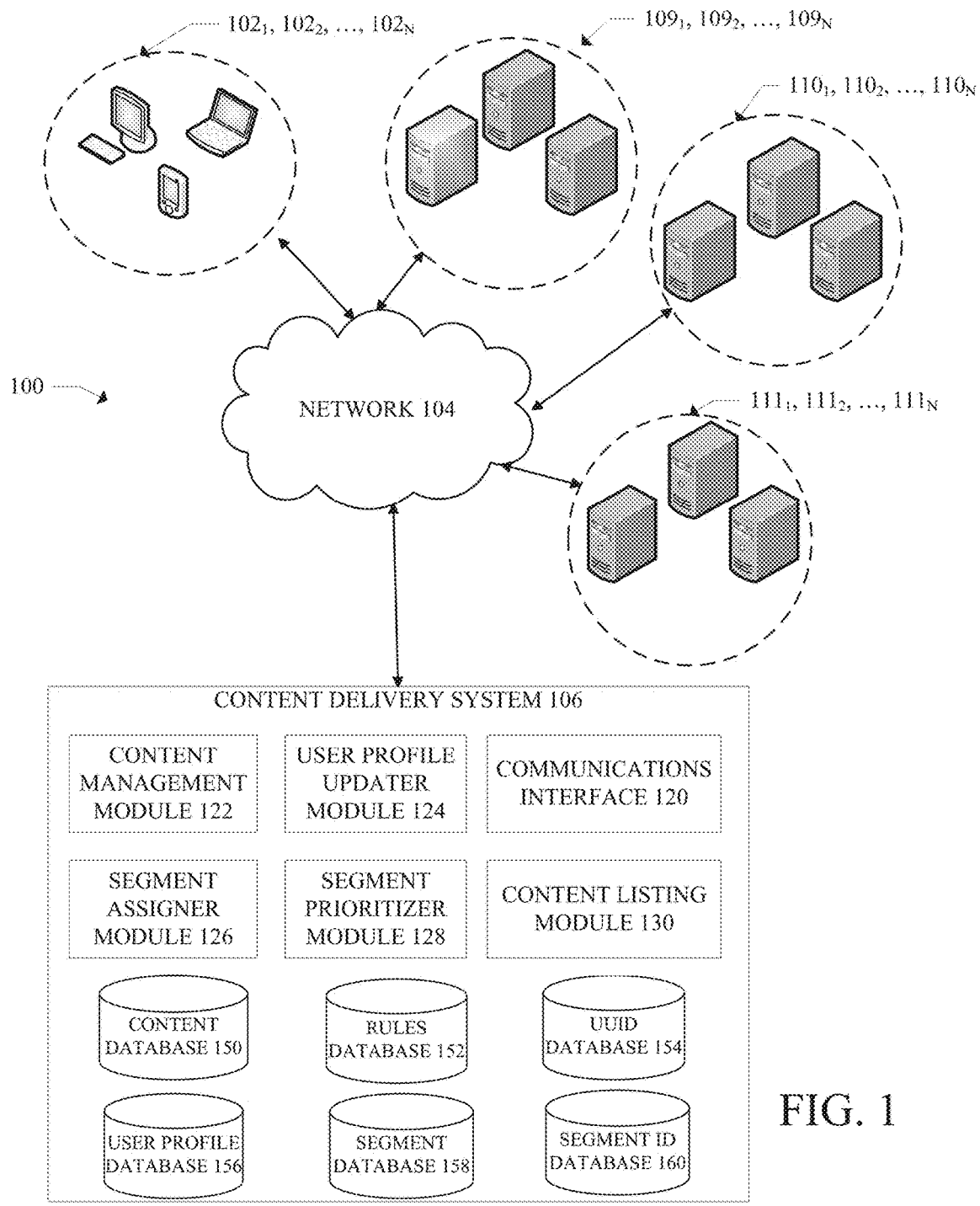
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1$, $102_2$, ..., $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1$, $109_2$, ..., $109_n$ (collectively "109") and content from one or more secondary content providers $110_1$, $110_2$, ..., $110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal $102_i$. A subsequent content package can include one or more items of invitational content that can be presented to a user of the user terminal $102_i$ while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

In some configurations, the content database 150 can maintain content items for presentation at the user terminals 102. The content database 150 can also maintain content associations with specific places, such as locales. Moreover, the content database 150 can maintain database corresponding to specific items of content. The metadata can specify unique identifiers, location information, association information, ranking information, etc. The content database 150 can also maintain lists of content items filtered or selected based on specific rules or criteria. For example, the content database 150 can maintain lists of content items that are relevant to specific geographic areas, demographics, segments, etc.

As described above, content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user(s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

The UUID database 154 can include UUIDs created or generated by the user terminals 102. For example, user terminal $102_i$ can generate a UUID to identify the user associated with the terminal $102_i$, and subsequently send the UUID to the content delivery system 106. The content delivery system 106 can then receive the UUID and store it in the UUID database 154. This way, the content delivery system 106 can identify users through the UUIDs without knowing or maintaining the user's real identity or any private information. In other words, the content delivery system 106 can simply identify users based on UUIDs created by the user terminals 102, which may not contain any private or personal information such as the user's real identity, and stored in the UUID database 154.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

The content delivery system 106 can receive requests to target or deliver invitational content to the terminals 102 from organizations $111_1$, $111_2$, . . . , $111_n$ (collectively "111"). The organizations 111 can include a business, a company, a corporation, a marketing entity, an advertiser, a partnership, a cooperative, an enterprise, a community, etc. Moreover, the organizations 111, as discussed herein, can refer to one or more specific devices, such as computers or servers, associated with the specific entities represented by the organizations 111.

The organizations 111 can have respective customers that the organizations 111 wish to target. The organizations 111 can provide UUIDs of its customers to the content delivery system 106, to allow the content delivery system 106 to target its customers based on the UUIDs. The content delivery system 106 can associate those UUIDs to specific network or device addresses to know where content intended for specific UUIDs should be delivered. In some configurations, the UUIDs are identifiers generated by the user terminals 102 and provided to the organizations 111 to identity users associated with the user terminals 102. Here, the user terminals 102 can generate the UUIDs to represent the associated users without including any private or personal information such as the user's real identity, and provide the UUIDs to the organizations 111 to allow the organizations 111 to identify the associated users. This way, the organizations 111 avoid storing or maintaining real and private user information. The user terminals 102 can generate the UUIDs using a program or module on the device that is configured to generate UUID's, such as random user identifiers. In some cases, the program can be an app associated with one or more of the organizations 111. For example, if organization $111_i$ is "ABC Services," the user terminals 102 can have an app for "ABC Services" installed on the device and configured to generate UUIDs for the users of user terminals 102 and communicate those UUIDs to the organization $111_i$. In some cases, when generating UUIDs, the app can be configured to verify the UUID created with the organization $111_i$, to ensure, for example, the UUID generated is unique and/or meets all UUID requirements for the organization $111_i$.

In other configurations, the UUIDs can be generated by the organizations 111 or any other device. In still other configurations, the organizations 111 can generate UUIDs and send the UUIDs to the user terminals 102 for selection by the user terminals 102 or their associated users. For example, the organizations 111 can generate a set of UUIDs and send the set of UUIDs to a user terminal. The user terminal can then select a UUID and use that UUID to identify the associated user without providing any real or private information about the user. The user terminal can then send the selected UUID back to the organizations 111 for use by the organizations 111 to identify the user at the user terminal without knowing the actual identity of the user.

The organizations 111 can collect and maintain information about their customers, such as transactions, purchase history, profiles, interests, preferences, user characteristics, etc., and use that information to create customer segments for targeting with invitational content. The organizations 111 can also receive segment identifiers from the content delivery system 106, which can be used to mask the identity of the customer segments they wish the content delivery system 106 to target with content. The segment identifiers can be, for example, strings such as private strings, random strings, etc. The organizations 111 can map the segment identifiers to specific segments and transmit the segment identifiers to the content delivery system 106, as well as UUIDs associated with such segment identifiers to allow the content delivery system 106 to target specific segment identifiers, which correspond to specific segments as previously described, with invitational content. For example, an organization $111_i$ can request that a particular segment identifier be targeted with invitational content selected or identified by the organization or otherwise associated by the organization with the segment identifier through a campaign, and the content delivery system 106 can then transmit such invitational content to the devices associated with UUIDs linked to the segment identifier. As a result, the content delivery system 106 can target customer segments of the organizations 111, without knowing the real identity of the segments or customers targeted, as the segments are disguised, masked, and concealed by the segment identifier and the users are similarly disguised, masked, and concealed by the UUIDs. However, the content delivery system 106 here is unaware as to why the invitational content being delivered is targeted to the users in the segment identifier. In fact, the content delivery system 106 is not even aware of the identity of the segment associated with the segment identifier or the identity of the users represented by the unique user identifiers.

The content delivery system 106 can include a segment identifier database 160. The segment identifier database 160 can maintain a list of segment identifiers generated to be sent to the organizations 111, which the organizations 111 can use to map to particular segments. The organizations 111 can associate such segment identifiers with specific segments and subsequently use the segment identifiers to represent the associated segments so as to allow the organizations 111 to avoid sending private segment information to the content delivery system 106 (or any other remote device) by instead sending the strings corresponding to specific segments. The content delivery system 106 receiving the segment identifier can be unaware of the actual segment and user information represented by the segment identifier. Thus, such information can be concealed from the content delivery system 106, without sacrificing the ability of the organizations 111 to use the content delivery system 106 to target content to their customers and segments. For example, the organizations 111 can request the content delivery system 106 to deliver invitational content from the content database 150 based on specific strings from the segment identifier database 160, and the content delivery system 106 can then target content to specific devices associated with UUIDs corresponding to the specific segment identifiers, without necessarily knowing specific user or segment information, as previously mentioned.

Moreover, the content delivery system 106 can maintain the UUIDs of the customers of the organizations 111 in the UUID database 154. Thus, the organizations 111 can share UUIDs of their customers with the content delivery system 106, and the content delivery system 106 can then store the UUIDs in the UUID database 154 for future use and reference. As previously mentioned, the UUIDs can originate from the user terminals 102, which can generate and send the UUIDs to the organizations 111 prior to the organizations 111 sending the UUIDs to the content delivery system 106. The content delivery system 106 can also link or map the UUIDs associated with the organizations 111 to specific segment identifiers in the segment identifier database 160. The association between specific UUIDs and segment identifiers can be provided to the content delivery system 106 by the organizations 111. The content delivery system 106 can store such associations in the UUID database 154, the segment identifier database 160, or a separate database (not shown).

In some embodiments, the content delivery system 106 can include a content-listing module 130. The content-listing module 130 can generate and/or maintain lists of content items, such as invitational content, that are estimated to be of interest to a user. The content-listing module 130 can also generate and/or maintain lists of places of interest for a user, or additional information of interest to the user. The items in any particular list generated or maintained by the content-listing module 130 can be selected based on user, location, device, or segment data associated with the user terminals 102. For example, the content-listing module 130 can generate a specific list of items based on segment data from one or more user terminals 102. The content-listing module 130 can also identify a geofence for the user terminals 102 based on location data, and further generate and/or identify a specific list of items based on the geofence and/or the location associated with the user terminals 102. The geofence can specify a geographic area or a perimeter, and the content-listing module 130 can identify and select items associated with the geographic area, for inclusion in the list of items. Thus, the list of items can include items specific to a geographic area. Again, the list of items can include advertisements for businesses located within the geographic area.

The content-listing module 130 can identify and/or select specific items to include in a list of items from one or more master lists of items or databases. For example, the content-listing module 130 can access a database containing all content items and search or filter the content items based on a determined segment to identify and/or select those content items associated with the specific segment specified. The content items in the master list or database can include associations with specific businesses, people, locales, entities, or locations to enable the content-listing module 130 to identify content items having specific associations. In some configurations, the content items can include metadata defining their respective associations to enable the content-listing module 130 to search and identify content items having specific associations, as previously described. Here, the metadata of the content items can also include additional information which can be used by the content-listing module 130 to search, filter, identify, order, or rank the content items. For example, the metadata can include a respective, unique identifier associated with the content item; the content item's association (e.g., the relationship or association defined for that particular content item); the identity of the content item's associated place or entity; etc. As another example, the metadata can include a tag, a description of the content item or its associated place, a location of the content in storage, a location of the place(s) associated with the content item, a rank of the content item and/or the place associated with the content item, a label, a URL, a preference, an identity, a status, a category, usage information, a configuration, a capability, a playback configuration, etc.

The content-listing module 130 can rank or order items in any specific list of items. For example, the content-listing module 130 can rank items based on their specific location relative to another location, such as a current location of a user terminal $102_i$, a predicted location of the user terminal $102_i$, a location of a locale, a location of a third party, a location of other devices, an identity of the user and/or the user terminal $102_i$, an identity of a place or locale, a history, a popularity, etc.

While the content delivery system 106 is presented with specific components, it should be understood by one skilled in the art, that the architectural configuration of system 106 is simply one possible configuration and that other configurations with more or less components are also possible.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

As previously mentioned, the present disclosure also contemplates embodiments in which information about users or segments is masked using segment identifiers. Thus, when targeting invitational content for specific user terminals 102 or segments, private information about user or segments that might be used for better targeting, may be concealed by instead using the segment identifier and/or unique user identifiers to represent such information. Accordingly, a business can target their customers without actually sharing private information about users or segments, and instead share segment identifiers which would not have any specific meaning to the recipient of such information, unless the relationships and associations of such information is revealed, all of which can be controlled by the business.

Moreover, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 2:
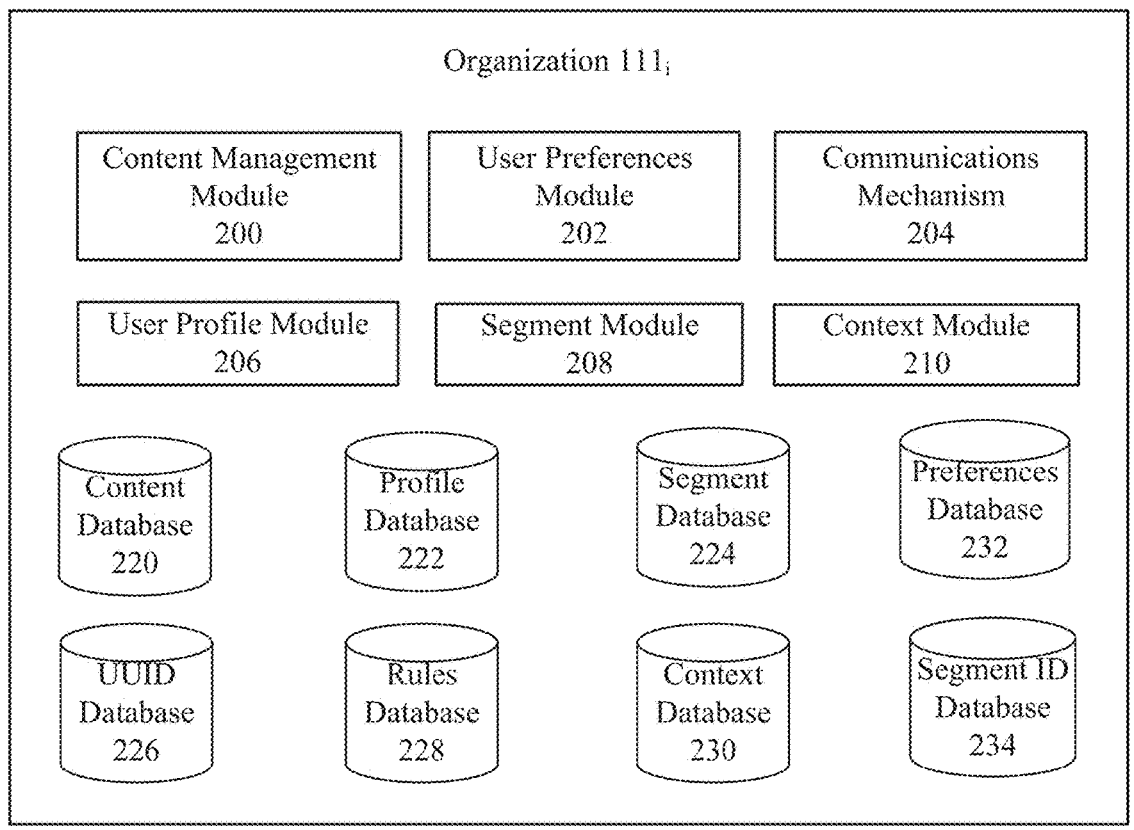
FIG. 2 illustrates an exemplary configuration of a client device.

The disclosure now turns to FIG. 2, which illustrates an exemplary configuration of an organization. The organization $111_i$, can include a content management module 200. The content management can manage and facilitate the generation and presentation of a content package. In some cases, the content management module 200 can combine content from local storage on the organization $111_i$, content delivery system 106, one or more primary content providers 109, and one or more secondary content providers 110, to generate or assemble a content package for the user terminal $102_i$. For example, in the case of a web page being delivered to user terminal $102_i$, the content management module 200 can assemble a content package by requesting the data for the web page from the content delivery system 106 or one of the primary content providers 109 maintaining the web page. For the invitational content on the web page provided by the secondary content providers 110, the content management module 200 can request the appropriate data according to the arrangement between the primary and secondary content providers 109 and 110. In some cases, the content management module 200 can request the appropriate data based on various parameters, conditions, rules, circumstances, or preferences at the organization $111_i$, user terminal $102_i$, or content delivery system 106.

Additionally, the content management module 200 can create content packages that contain content from a single content provider. That is, a content package can contain only primary content or a content package can contain only secondary content, for example. However, the content package is not limited to the content from content providers 109 and 110. Rather, the content package can include other data generated at the content delivery system 106, organization $111_i$, or user terminal $102_i$. For example, the organization $111_i$ can include a content database 220 for locally storing/caching content maintained by organization $111_i$ content delivery system 106, or content providers 109 and 110. The data in the content database 220 can be refreshed or updated on a regular basis to ensure that the content in the database 220 is up to date at the time of a request from organization $111_i$ or user terminal $102_i$. However, in some cases, the content management module 200 can be configured to retrieve content directly from content providers 109 and 110 if the metadata associated with the data in the content database 220 appears to be outdated or corrupted, for example.

In some embodiments, the content management module 200 can include content-listing functions. The content-listing functions can generate and/or maintain lists of content items, such as invitational content, that are estimated to be of interest to a user. The content-listing functions can also generate and/or maintain lists of places of interest for a user. The items in any particular list generated or maintained by the content-listing functions can be selected based on location data associated with the user terminal $102_i$, as well as context, profile, segment, or preferences information as further described below. For example, the content-listing functions can generate a specific list of items based on location data from user terminal $102_i$. The content-listing functions can also identify a geofence for the user terminal $102_i$ based on the location data. The geofence can specify a geographic area or a perimeter, and the content-listing functions can identify and select items associated with the geographic area, for inclusion in a list of items. Thus, the list of items can include items specific to the geographic area. For example, the list of items can include advertisements for businesses located within the geographic area.

The content-listing functions can identify and/or select specific items to include in a list of items from one or more master lists of items or databases. For example, the content-listing functions can access a database containing all content items and search or filter the content items based on a determined geofence or user segment to identify and/or select those content items associated with a specific segment and geographic area or perimeter specified in the geofence. The content items in the master list or database can include associations with specific businesses, people, locales, entities, or locations to enable the content-listing functions to identify content items having specific associations. In some configurations, the content items can include metadata defining their respective associations to enable the content-listing functions to search and identify content items having specific associations, as previously described. Here, the metadata of the content items can also include additional information which can be used by the content-listing functions to search, filter, identify, order, or rank the content items. For example, the metadata can include a respective, unique identifier associated with the content item; the content item's association (e.g., the relationship or association defined for that particular content item); the identity of the content item's associated place or entity; etc. As another example, the metadata can include a tag, a description of the content item or its associated place, a location of the content in storage, a location of the place(s) associated with the content item, a rank of the content item and/or the place associated with the content item, a label, a URL, a preference, an identity, a status, a category, usage information, a configuration, a capability, a playback configuration, etc.

The content-listing functions can rank or order items in any specific list of items. For example, the content-listing functions can rank items based on their specific location relative to another location, such as a current location of user terminal $102_i$, a predicted location of the user terminal $102_i$, a location of a locale, a location of a third party, a location of other devices, an identity of the user and/or the user terminal $102_i$, an identity of a place or locale, a history, a popularity, etc. In addition, the content-listing functions can rank items based on other factors, such as current or future context, segment information, user information, statistical information, etc.

In some configurations, the content database 220 can maintain content items for presentation at the user terminal $102_i$. The content database 220 can also maintain content associations with specific places, such as locales. Moreover, the content database 220 can maintain a database corresponding to specific items of content. Further, metadata can specify unique identifiers, location information, association information, ranking information, etc. The content database 220 can also maintain lists of content items filtered or selected based on specific rules or criteria. For example, the content database 220 can maintain lists of content items that are relevant to specific geographic areas, demographics, segments, circumstances, etc. The content database 220 can maintain specific content items for presentation at user terminal $102_i$. The content items, in some cases, can be items selected by the organization $111_i$.

Organization $111_i$ can select and/or deliver one or more items of content from the content database 220 based on a request, a preference, a rule, a condition, etc. For example, organization $111_i$ can select one or more content items for presentation to user terminal $102_i$ based on a preference in the preferences database 232, context information in the context database 230, segment information in the segment database 224, rules from the rules database 228, profile information from the profile database 222, etc. Organization $111_i$ can also instruct content delivery system 106 to deliver invitational content selected, identified, or requested by the organization $111_i$ for delivery to the user terminal $102_i$ based on the information described above.

In some embodiments, the content delivery system 106 can preselect the content package before a request is received. Yet in other embodiments, the organization $111_i$ can preselect the content package, a portion of a content package, or conditions for selecting a content package, and transmit a request to the content delivery system 106 or the content database 220 accordingly.

In addition, organization $111_i$ can transmit a request for content to the content delivery system 106, where the request include information to be used by the content delivery system 106 in selecting the content to be provided to user terminal $102_i$. Such information can include, for example, a campaign. Alternatively, the organization $111_i$ can create a request to content management module 200 or content delivery system 106 for presentation or delivery of content, where the request includes information for selecting the content for presentation or delivery. Such information included in a request can include, among other things, location information, profile information, segment information, campaign information, user information, encrypted information, timing or delivery information, preferences, context information, device information, context information, rules, etc. In some embodiments, user terminal $102_i$ can transmit location information to the content delivery system 106 or organization $111_i$, which can assist the content delivery system 106 or organization $111_i$ in selecting invitational content or a content package to be delivered to user terminal $102_i$. User terminal $102_i$ can also obtain location information from one or more components of the device, and the organization $111_i$ can use that information to select one or more content items from the content database 220.

In other embodiments, organization $111_i$ can transmit segment information to the content delivery system 106, to assist the content delivery system 106 in delivering targeted content to user terminal $102_i$ based on the segment information. Likewise, organization $111_i$ can also obtain segment information from the segment database 224, and use that information to select one or more content items from the content database 220. The segment information in the segment database 224 can be generated by segment module 208 or otherwise obtained from a separate device, such as content delivery system 106.

The segment module 208 can apply a set of user characteristics associated with a user (including segments to which a user has been previously assigned) to assign the user to one or more targeted segments. The segment module 208 can obtain the set of user characteristic values from the user profile database 222, from the user's activities during the current session, from user activities in a user history, from the context database 230, etc. The segment module 208 can assign a user to one or more defined targeted segments in the segment database 224, or alternatively, a user can be assigned to a custom targeted segment defined to meet specific goals of a content provider or campaign.

Based on the assigned segments, the user profile database 222 can be updated to reflect the segment assignments. Additionally, the organization $111_i$ can use the segment assignments to select targeted content from the content database 220 or to request content from a separate device, such as content delivery system 106. In some cases, the user profile data in the user profile database 222 can change over time so the segment module 208 can be configured to periodically update the segment assignments in the user profile database 222. The segment assignment update can be triggered at specified intervals, upon detection of a change in the user profile database 222, and/or upon detection of a specified activity in the organization $111_i$ or user terminal $102_i$. In some cases, a user can be assigned to more than one segment, and each segment can be ranked or ordered. Moreover, segments in the segment database 224 can also be prioritized as described above in FIG. 1.

The context database 230 can store information associated with a user's current context. For example, the context database 230 can store the current application or device usage information, browsing information, user activity, type of content being consumed by the user, user location information, user or device state or status, user movement, device information, etc. In some cases, the context database 230 can also store information associated with a predicted context of a user, such as a future context at a specific day and/or time. For example, the context database 230 can store information defining a predicted location of the user at a future time or information associated with a predicted interest or state of the user at the future time. In some cases, the information in the context database 230 can be used to assign or prioritize segments as previously mentioned. The information in the context database 230 can also be used to select content from the content database 220 or a remote content database, request content from a remote device, rank content, assemble content, etc. In some cases, the information from the context database 230 can also be combined with information obtained from the preferences database 232, the rules database 228, the segment database 224, the profile database 222, etc., to assign or prioritize segments, select content from the content database 220 or a remote content database, request content from a remote device, rank content, assemble content, etc. Moreover, the context module 210 can collect, analyze, manage, modify, and store the context information in the context database 230. For example, the context module 210 can monitor or log user activities, and generate context information for storage in the context database 230.

Organization $111_i$ can also include a user preferences module 202. The user preferences module 202 can allow a user to customize user preferences to his or her needs, filter the amount and type of content to be received by a user at user terminal $102_i$, etc. In some cases, users may be given the opportunity to opt-in or opt-out of receiving specific types of advertising, such as proximity-based advertising, for example.

In some cases, users may set preferences specifying a distance that defines a maximum or minimum proximity to a targeted establishment. To this end, the users may specify that they wish to only receive content associated with establishments or entities located within a specific distance of the user's current or future location. Examples include 0.5 miles, 1 mile, 2 miles, and 5 miles. Users in densely populated areas, or who are walking through a mall with many stores in close proximity to each other, may opt for a much shorter proximity range, in order to avoid being inundated with content that is outside the scope of their walking or commuting proximity while at a given user location point. In some embodiments, automatic ranging based on location and/or density of content providers can also be provided, rather than a user manually adjusting the details of proximity distance.

In some cases, user preferences can include a taxonomy of offers that a user wishes to receive. This can indicate that only specific product and service categories should be received. The taxonomy can be a set of verticals, or markets in which vendors offer goods or services, that a user allows engagement with. For example, a user may decide to receive content related to fine dining restaurants and retail shopping, but not from entertainment venues or bars. Here, the user can specify these preferences within the user preferences module 202. In some embodiments, the taxonomy can become more granular and specific as a user visits specific places. For example, if a user has been demonstrated to visit or engage with invitational content from entertainment venues at a threshold frequency, the taxonomy can allow the user to specify additional user preferences for allowing or disallowing invitational content from nightclubs, sports arenas, concert halls, movie theaters, and the like. In this way, the taxonomy can be dynamic and can learn from past behavior or preferences, and can also zoom-in on the categories of interest to expand the options for the user. However, in some embodiments, the user may also be able to turn off the use or presentation of subcategories or the dynamic learning of the taxonomy.

User preferences can also be used to determine how often offers may be received by a user, and when those offers may be received. The user preferences module 202 can limit offer notifications to only be displayed during certain hours of the day. For instance, in one embodiment a user may specify that invitational content should only be broadcasted between 9 AM and 8 PM on any given day, or one or more specified days. In another embodiment, a user may specify that invitational content should be received when the user is present in his office building or in a commercial venue, for example.

Rate throttling can also be an additional consideration. For example, a user can specify that no more than a set number of offers should be broadcasted or delivered in a given span of time, or in total. To illustrate, the user can specify that only up to a maximum of 5 offers should be delivered to that user in a week. The throttling can also, in some case, be coupled with other settings such as frequency settings. For example, the user can specify that only a maximum of 5 offers should be delivered in a week, but each offer should be at least 5 minutes apart or, alternatively, each offer should be no more than 5 minutes apart.

In some embodiments, a user can choose to "blacklist" a particular invitational content provider from broadcasting to them. In additional embodiments, a user can specify that the same invitational content provider should not broadcast to the user again for a specified period of time, e.g., ten minutes, one hour, one day, etc.

The user profile module 206 can store the preferences in the user preferences database 232. The preferences in the user preferences database 232 can also be associated with user profiles stored in the profile database 222.

The profile database 222 can store any profile information created and stored by the user profile module 206. The profile information can include profiles created for one or more users, devices, or accounts. The profiles can include information such as, for example, a user name, a user ID, address information for the user, user preferences or a reference to user preferences stored elsewhere (e.g., user preferences database 222), a user alias, contact information, identifying information, or any other profile information according to conventional profile methods.

The UUID database 226 can also store a unique user ID representing a user. The unique user ID can represent a user profile in the profile database 222. In some cases, the unique user ID can be used to identify a user without disclosing private information about the user, such as the user's name or social security number, for example. In some configurations, the UUIDs in the UUID database 226 can be generated by user terminals 102. Thus, the user terminals 102 can generate UUIDs identifying users associated with the user terminals 102, and send the UUIDs to the organization $111_i$ for use in identifying the users. The organizations $111_i$ can receive the UUIDs from the user terminals, and store them in the UUID database 226.

The information in the various databases can be communicated to the content delivery system 106 through the network 104. To facilitate communications with the content delivery system 106 and/or any other device or component, the organization $111_i$ can include a communications interface 120.

In some cases, however, information is maintained at the organization $111_i$ and/or user terminal $102_i$ to protect the user's privacy. Moreover, certain information transmitted from organization $111_i$ and/or user terminal $102_i$ to a separate device, such as content delivery system 106, can be degraded, encrypted, or otherwise hidden or protected for privacy reasons. For example, to protect the user's privacy interest in his or her current location, organization $111_i$ or user terminal $102_i$ can ensure to obscure location information sent to content delivery system 106.

Moreover, information sent to a server, such as content delivery system 106, can be obscured, concealed, or encrypted in many ways. For example, a portion of the information sent to the server can be omitted in order to provide the server incomplete information so as to protect the precise information from being fully revealed. To illustrate, instead of sending the exact location of user terminal $102_i$, the location information can merely specify a vicinity, as opposed to exact coordinates, of user terminal $102_i$ to protect the exact location of user terminal $102_i$. Thus, if the user associated with user terminal $102_i$ is at church, for example, but does not want that information disclosed, the degraded location of user terminal $102_i$ can omit such details by providing a vicinity of the user, which may not precisely place user terminal $102_i$ at the church.

As another example, strings, identifiers, or symbols representing particular information can be sent to a server in lieu of the actual information to conceal the actual information represented by such strings, identifiers, or symbols. In some embodiments, organization $111_i$ can use strings, identifiers, or symbols to represent segments or users, and send such strings, identifiers, or symbols to the server instead of the actual information. For example, organization $111_i$ can send to the server unique user IDs from the UUID database 226, instead of actual names or real identifying information, to conceal and protect the identity of users. As another example, organization $111_i$ can send to the server a segment identifier representing a segment for targeting content to hide the actual segment represented by the segment identifier. In some cases, the organization $111_i$ can use a random string to represent selected, private information, such as personal user information or segment information. The segment identifier database 234 can store and maintain segment identifiers and any association, mapping, or relationship information, such as associations between segment identifiers and user or segment information, for example.

Other methods of concealing or encrypting information are also contemplated herein. However, these are provided as examples for the sake of clarity.

Figure 3:
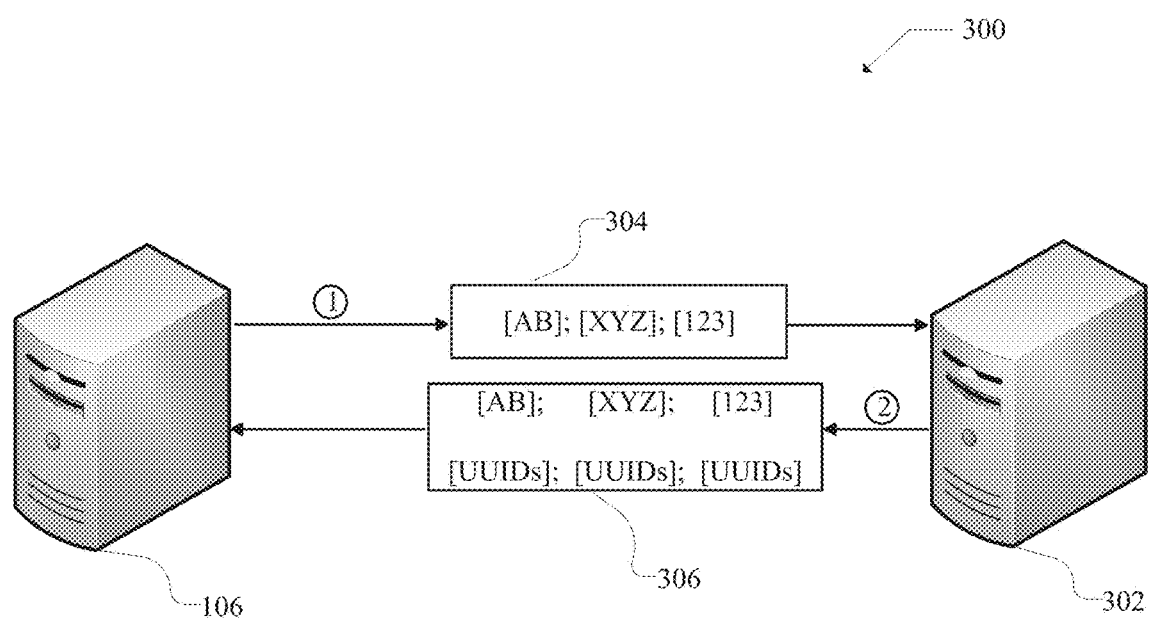
FIG. 3 illustrates an example system for segment targeting.

The disclosure now turns to FIG. 3, which illustrates an example system 300 for segment targeting. The content delivery system 106 first sends a set of segment identifiers 304 to device 302. The device 302 can be any computing device, such as a server, a laptop, etc. In some cases, the device 302 can be associated with a particular merchant, business, organization, or entity. For the sake of clarity and simplicity, the following description will discuss the device 302 as being a computing device associated with a particular business.

The content delivery system 106 can transmit the set of segment identifiers 304 to the device 302 automatically or in response to a request or triggering event, for example. For example, the content delivery system 106 can otherwise transmit the set of segment identifiers 304 in response to a request from a business associated with the device 302. Here, the business can determine that it wants to target one or more of its customers or user segments with invitational content, and subsequently request the set of segment identifiers 304 from the content delivery system 106 to target segments as further described below. The request for the set of segment identifiers 304 can be generated by the business after an event, such as an identification or creation of a new targeting segment, an analysis of the business's customers and/or customer habits and behavior, one or more new users, a new store, a schedule, etc. In some cases, the request can even be generated by the business after a determination that a previous set of segment identifiers has been in use for more than a threshold amount of time. This way, the business can request, obtain, and use new segment identifiers in an on-going basis to replace old segment identifiers to avoid a detection of a meaning of a previously-used string, for example.

The set of segment identifiers 304 can include one or more segment identifiers. The segment identifiers can be, for example, strings, random strings, private strings allocated to a business or entity, flags, tags, symbols, etc. In some cases, the content delivery system 106 can, for example, generate random or semi-random strings and store such strings to be provided to businesses that request one or more segment identifiers for use in targeting segments. In addition, the content delivery system 106 can assign or associate specific segment identifiers or strings to a business or entity to avoid providing a same segment identifier or string to more than one business or entity.

Before or after receiving the set of segment identifiers 304, the device 302 can analyze information about the business's customers to group the business's customers into segments. The device 302 can analyze prior user transactions, customer purchasing information, or any other preference or information maintained by the device 302 for its customers. Thus, the device 302 can segment customers and maintain customer segments for targeting content. For example, the device 302 can analyze the purchasing history or habits of customers and group the customers into segments based on the purchasing information analyzed. To this end, the device 302 can collect information about every customer transaction and maintain such information for use in segmenting customers. The device 302 can also maintain profiles of the business's customers for use in better segmenting customers. A customer profile can maintain information about a particular customer, such as previous transactions, preferences, habits, personal information provided by the customer, etc. The device 302 can collect and identify information about the business's customers on an on-going basis, and continuously update or adapt the customer segments as necessary when new information is collected or analyzed. As such, the customer segments can be maintained up-to-date by the device 302, which can dynamically modify or update the customer segments based on real-time information as well as previously-collected information.

Once the device 302 receives the set of segment identifiers 304, it can associate one or more segment identifiers in the set of segment identifiers 304 with respective customer segments. For example, the device can map or associate the segment identifier "AB" in the set of segment identifiers 304 with a "sportswear" customer segment previously created by the business or device 302. Thus, the segment identifier "AB" can represent the business's "sportswear" customer segment, and the device 302 and the business can use the segment identifier "AB" to identify the "sportswear" customer segment and those customers associated with that segment.

After associating or mapping one or more segment identifiers from the set of segment identifiers 304 to respective customer segments, the device 302 can send segment targeting information 306 back to the content delivery system 106. The segment targeting information can include any of the segment identifiers that have been associated or mapped with a customer segment, along with one or more unique user IDs (UUIDs) associated with customer segments represented by those segment identifiers. For example, if segment identifier "AB" represents, to the device 302, the "sportswear" customer segment, and the "sportswear" customer segment includes users Mike and Bob, having UUIDs 845 and 639 respectively, then the device 302 can send to the content delivery system 106 the segment identifier "AB" along with UUIDs 845 and 639, as the segment targeting information 306. The device 302 can keep the real identity of the customer segments represented by the segment identifiers it sends back to the content delivery system 106 as well as the real identity of the customers represented by the UUIDs the device 302 sends to the content delivery system 106. This way, the device 302 can use information about the business's customers collected and analyzed by the device 302 or business to better target segments through the content delivery system 106, without actually providing identifying information, beyond the segment identifiers and the UUIDs, to the content delivery system 106. Essentially, the real identity of the segments and customers, as well as any private information used or analyzed by the device 302, can be masked or concealed from the content delivery system 106 when targeting segments by use of the segment targeting information 306.

In some cases, the UUIDs can be generated by the user terminals. For example, a user's device can generate a UUID for that user and send the UUID to the device 302. The device 302 can then use the UUID to identify the user without knowing the user's actual identity or storing private information about the user.

Upon receiving the segment identifiers and UUIDs from the device 302, the content delivery system 106 can store the segment targeting information 306 for future use by the content delivery system 106 in targeting segments for the business. Here, the device 302 or business can send a request or instructions to the content delivery system 106 to target a particular segment identifier, indicated in the request, with invitational content. The device 302 can specify the specific item(s) of content that should be used to target the particular segment identifier, or otherwise provide information to the content delivery system 106 for selecting an item of content to target the particular segment identifier.

The content delivery system 106 can then deliver invitational content to devices associated with the UUIDs of the particular segment identifier targeted by the invitational content. This way, the content delivery system 106 can accurately and effectively target the business's customer segments without ever knowing personal or private details about the targeted customers, as such details are maintained by the device 302 of the business and are not shared with the content delivery system 106. In fact, such personal or private details are masked or concealed from the content delivery system 106 through the use of the segment identifiers and the UUIDs. However, the targeting performed by the content delivery system 106 can still benefit from the business's customer information and instructions, since the device 302 itself uses such information to create the targeting segments and select (or aid in selecting) and instruct the content delivery system 106 how to deliver the invitational content to target segments of the business without knowledge of such segments.

Figure 4:
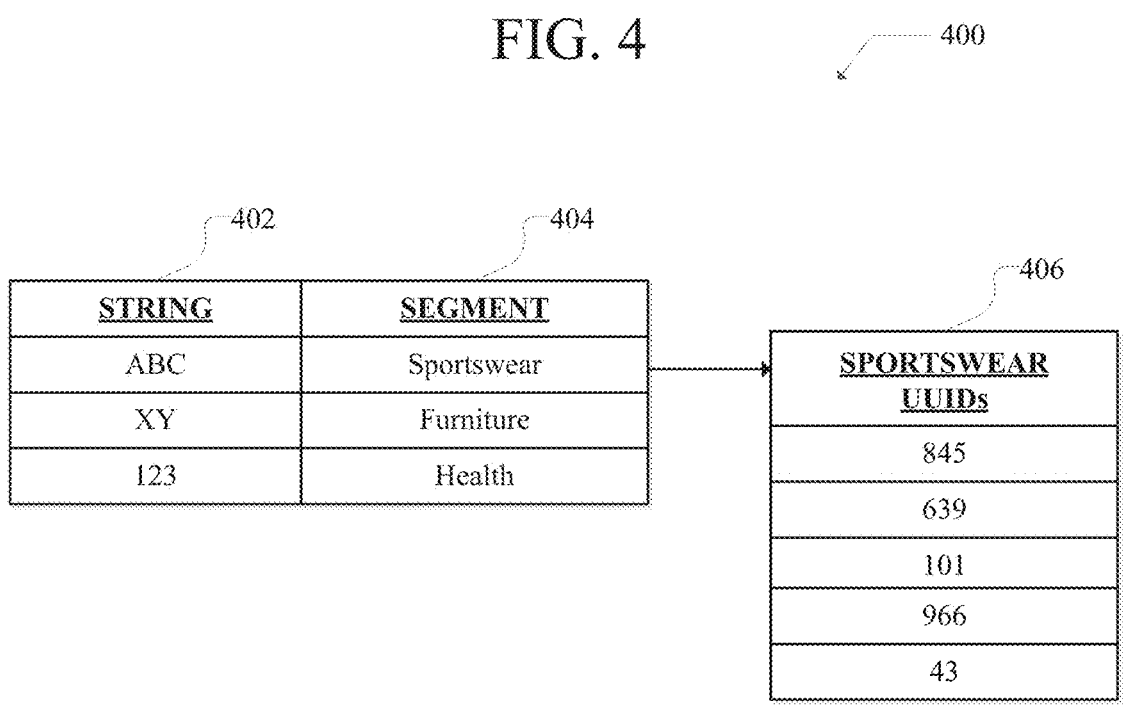
FIG. 4 illustrates an exemplary mapping of segment identifiers for segment targeting.

FIG. 4 illustrates an example mapping 400 of segment identifiers for segment targeting. The mapping 400 can be maintained by a business or organization's device, such as device 302 in FIG. 3, to coordinate the targeting of invitational content to segments with the content delivery system 106. The mapping 400 can include segment identifiers 402 received from the content delivery system 106. The mapping 400 can also include segments 404 associated with the segment identifiers 402. The segments 404 can be associated with the segment identifiers 402 by the business or organization based on customer information, such as purchase history or profiles, obtained by the business or organization. For example, the business or organization can determine which customers are likely to want sportswear items and/or which customers have demonstrated an interest in sportswear items, and group one or more of those customers into a sportswear segment. The business or organization can also create other segments in a similar fashion, such as a furniture segment, a health segment, an entertainment segment, a fashion segment, etc.

The business or organization can then associate the segment identifiers 402 to the segments 404 to create the mapping 404. This way, when communicating with the content delivery system 106 or any other entity or device, the business or organization can refer to a particular segment using the segment identifier associated with that segment to mask and conceal the true identity of the particular segment. As such, the content delivery system 106 (or any other entity or device receiving the segment identifier) is unable to determine from the segment identifier real information about a customer associated with such segment identifier, such as purchasing habits, interest, or associated segment of such customer, as the business can protect the identity of a segment by using a segment identifier to represent the segment and withholding the association between the segment identifier and the segment.

The mapping 400 can also associate UUIDs with particular segments and segment identifiers. For example, the mapping 400 can associate UUIDs 406 with the "sportswear" segment, which is associated with the "ABC" segment identifier. Thus, through the association of UUIDs 406, the business can associate a segment identifier with both a segment and the customers in the segment. As a result, the segment identifier "ABC" can represent to the business the "sportswear" segment made up by customers 845, 639, 101, 966, and 43. The business can also include a separate mapping (not shown) associating each of the UUIDs 406 with specific customer information, such as customer name, address, contact information, preferences, profile, previous transactions, purchasing habits, interests, etc. The business can also anonymize its customers through the use of the UUIDs by withholding real, associated customer information when providing UUIDs to a separate entity or device.

In some embodiments, the content delivery system 106 and/or a separate advertising server can store the UUIDs provided by the business and maintain an address, such as a network or device address, associated with the UUIDs in order to know where to deliver content intended for those UUIDs. This way, the business can request specific UUIDs to be targeted with content, and the content delivery system 106 can know where to deliver such content. Thus, the business can provide the segment identifiers 402 and the respective UUIDs associated with each of the segment identifiers 402 to the content delivery system 106, and later request that content be delivered or targeted to a particular segment identifier. The content delivery system 106 can then deliver the content to specific devices associated with the UUIDs in the segment identifier, to target the segment identifier with invitational content.

Having disclosed some basic system components and concepts, the disclosure now turns to the exemplary method embodiment shown in FIG. 5. For the sake of clarity, the method is described in terms of an organization $111_i$, as shown in FIG. 1, configured to practice the method. The steps outlined herein are exemplary and can be implemented in any combination thereof, including combinations that exclude, add, or modify certain steps.

The system maps users to targeting segments based on respective purchase history information of the users (500). The users can also be mapped to the targeting segments based on one or more additional factors, such as user profiles, demographics, user characteristics, location information, campaign information, user preferences, user context, user activity, etc.

The system also receives one or more strings from a server, the segment identifiers to be associated with a targeting segment from the targeting segments with the segment identifiers for anonymously identifying the targeting segment (502). The system then associates the segment identifiers with the targeting segments and users mapped to the targeting segments (504). The system can request a number of segment identifiers from the server based on the number of targeting segments identified by the system. Moreover, the server can be an advertising or content delivery system, for example.

Next, the system sends, to the server, the segment identifiers and unique user identifiers of the users mapped to the targeting segments associated with the segment identifiers, the unique user identifiers masking respective identities of the users from the server and the segment identifiers masking an identity of the targeting segments associated with the segment identifiers (506). The unique user identifiers can include identifiers generated by, or received from, the user's client device as previously mentioned. The system then instructs the server to deliver selected invitational content to at least one unique user identifier associated with a segment identifier (508).

In some configurations, the system can send a request to the server to deliver invitational content to a segment represented by the segment identifier. The server can then deliver the invitational content to the segment, without ever knowing the identity of the segment or the users in the segment. The request can identify the invitational content to be delivered to the targeted UUID or instructions for assembling or selecting the invitational content. In some cases, the request can include a campaign, which can define how content is to be delivered and/or what content or content type is to be delivered. Further, the request can be sent to the server in response to a triggering event. The triggering event can be, for example, a user action or behavior, a date, a time, a user context, a user location, an estimated user interest, a campaign, a sale, a promotion, a condition, etc.

As previously described, the system can select the invitational content to be delivered to a segment, or instruct the server how to select the invitational content it delivers. For example, the system can select a content item based on a characteristic of the segment, user behavior, a user context, campaign information, etc. The system can then send the selected content item to the server for delivery to the targeted UUID. Further, the system can be a device associated with a business or organization, and the users can include customers, subscribers, etc.

Figure 6B:
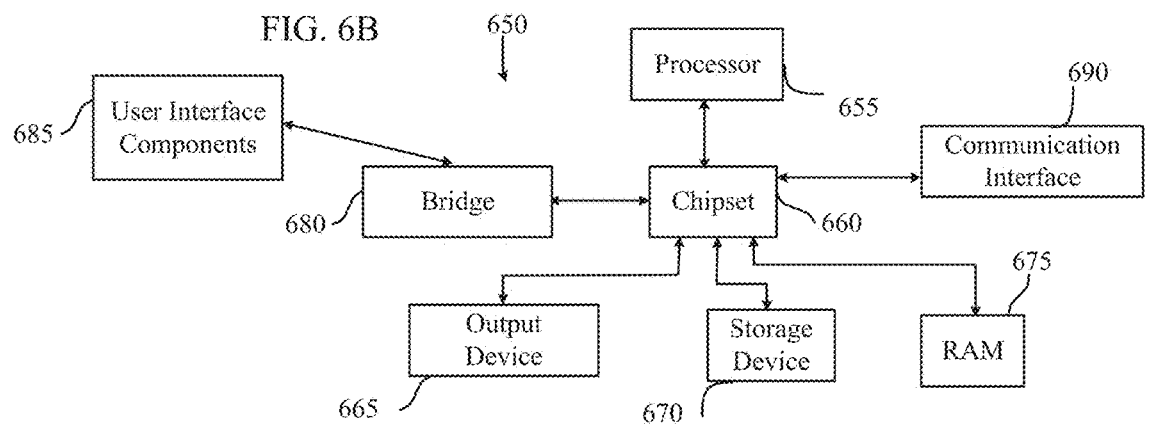
FIG. 6A and FIG. 6B illustrate exemplary system embodiments.
Figure 6A:
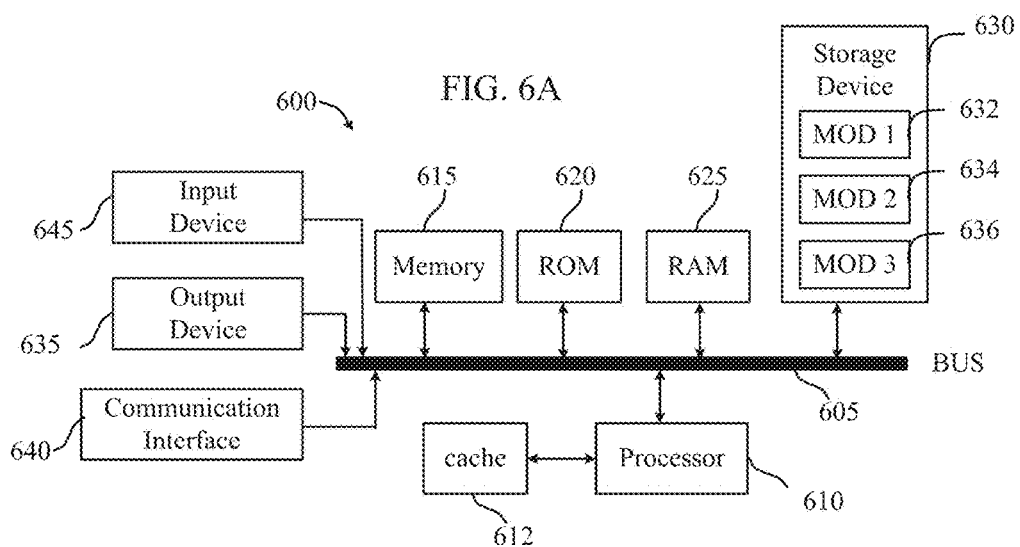

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A computer-implemented method comprising:
receiving, by a server associated with at least one organization, from respective client computer devices, anonymous user identifiers which respectively correspond to users associated with the respective client computer devices, wherein the anonymous user identifiers anonymously identify the users to the server associated with the at least one organization without revealing a respective identity of the users to the server associated with the at least one organization;

mapping, by the server associated with the at least one organization, the anonymous user identifiers to a targeting segment;

requesting, by the server associated with the at least one organization, from a content delivery system, an anonymous segment identifier for anonymously identifying the targeting segment, the anonymous segment identifier being requested by the server associated with the at least one organization without revealing to the content delivery system an identity of the targeting segment;

receiving, by the server associated with the at least one organization, from the content delivery system, the anonymous segment identifier;

associating, by the server associated with the at least one organization, the anonymous segment identifier with the anonymous user identifiers mapped to the targeting segment, to yield an anonymous targeting segment;

sending, by the server associated with the at least one organization, to the content delivery system, the anonymous targeting segment comprising the anonymous segment identifier and the anonymous user identifiers, wherein the anonymous targeting segment masks both the respective identity of the users and the identity of the targeting segment from the content delivery system; and instructing, by the server associated with the at least one organization, the content delivery system to deliver selected media content to one or more respective client computer devices associated with at least one of the anonymous user identifiers in the anonymous targeting segment.

2. The method of claim 1, further comprising selecting the selected media content based on the one or more segment characteristics.

3. The computer-implemented method of claim 1, further comprising wherein instructing the content delivery system to deliver the selected media content comprises sending a request to deliver the selected media content, the request including at least one of an identification of the selected media content to be delivered or an instruction for assembling the selected media content to be delivered.

4. The computer-implemented method of claim 3, wherein the request defines a campaign of invitational content associated with at least one of the selected media content or the anonymous targeting segment.

5. The computer-implemented method of claim 3, wherein the request is sent in response to a triggering event, the triggering event comprising at least one of a user action, a date, a time, a user context, a location, an estimated interest, or a campaign.

6. The computer-implemented method of claim 1, wherein the anonymous segment identifier comprises at least one of a private string assigned to the at least one organization or a randomly generated string.

7. The computer-implemented method of claim 1, wherein mapping the anonymous user identifiers to the targeting segment further comprises:

identifying customers of the at least one organization;

analyzing a purchasing history of the customers;

based on the analyzing of the purchasing history of the customers, identifying and generating targeting user segments; and associating the targeting segment to the anonymous user identifiers.

8. The computer-implemented method of claim 7, wherein the purchasing history is based on previous customer transactions with the at least one organization.

9. The computer-implemented method of claim 7, wherein the anonymous user identifiers are mapped to the targeting segment further based on at least one of associated user profiles, demographics, user characteristics, location information, user preferences, or a campaign.

10. The computer-implemented method of claim 1, wherein the anonymous targeting segment is sent to the content delivery system without information identifying one or more user characteristics used to create the targeting segment or a real identity of the users associated with the anonymous user identifiers.

11. The computer-implemented method of claim 1, further comprising:

generating, by the server associated with the at least one organization, a plurality of targeting segments associated with respective targeting segment identifiers;

receiving a plurality of anonymous segment identifiers from the content delivery system in response to a segment identifier request from the server associated with the at least one organization, the plurality of anonymous segment identifiers being received by the server associated with the at least one organization without information identifying a particular segment identity or segment characteristic of each respective one of the plurality of anonymous segment identifiers; and associating the plurality of anonymous segment identifiers with the respective targeting segment identifiers.

12. The computer-implemented method of claim 11, the plurality of anonymous segment identifiers being received from the content delivery system based on the segment identifier request, the segment identifier request defining a first number of anonymous segment identifiers to be received, the first number being based on a second number of respective targeting segment identifiers associated with the targeting segments.

13. A server associated with at least one organization, the server comprising:

one or more processors; and at least one computer-readable storage medium having stored therein instructions which, when executed by the one or more processors, cause the server to:

receive, from respective client computing devices, anonymous user identifiers corresponding to respective users associated with the respective client computing devices, wherein the anonymous user identifiers anonymously identify the respective users to the server associated with the at least one organization without revealing to the server associated with the at least one organization a respective user identity of the respective users;

associate the anonymous user identifiers to a targeting segment based on a match between one or more segment characteristics associated with the targeting segment and one or more respective user characteristics attributed to the anonymous user identifiers based on previous activity;

requesting, from a content delivery system, an anonymous segment identifier for anonymously identifying the targeting segment, the anonymous segment identifier being requested by the server associated with the at least one organization without revealing, to the content delivery system, a segment identity of the targeting segment, the one or more respective user characteristics, or the one or more segment characteristics;

receive, from the content delivery system, the anonymous segment identifier;

associate the anonymous segment identifier with the anonymous user identifiers associated with the targeting segment, to yield an anonymous targeting segment;

transmit, to the content delivery system, the anonymous targeting segment comprising the anonymous segment identifier and the anonymous user identifiers, wherein the anonymous targeting segment masks from the content delivery system both the respective identity of the respective users and the segment identity of the targeting segment; and transmit, to the content delivery system, a request to deliver media content to one or more of the respective client computing devices associated with at least one of the anonymous user identifiers in the anonymous targeting segment.

14. The server of claim 13, wherein the request is transmitted to the content delivery system in response to a triggering event, wherein the triggering event comprises at least one of a user action, a user context, an estimated user interest, a user location, a content type, a time, a date, a campaign, or a sale.

15. The server of claim 13, wherein the selected media content is selected by the server, the request including at least one of an identification of the selected media content to be delivered or an instruction for assembling the selected media content to be delivered.

16. The server of claim 13, the request including an identification of the selected media content to be delivered.

17. The server of claim 13, wherein the request identifies the selected media content to be delivered and the one or more of the respective client computing devices selected to receive the selected media content.

18. The server of claim 13, wherein the anonymous segment identifier is received as part of a plurality of anonymous segment identifiers received from the content delivery system based on a segment identifier request defining a first number of anonymous segment identifiers to be received, the first number being based on a second number of targeting segments at the server.

19. A non-transitory computer-readable storage medium having stored therein instructions which, when executed by one or more processors, cause a server associated with at least one organization to:

receive, from respective client computing devices, anonymous user identifiers corresponding to respective users associated with the respective client computing devices, wherein the anonymous user identifiers anonymously identify the respective users to the server associated with at least one organization without revealing to the server associated with at least one organization a respective user identity of the respective users;

map the anonymous user identifiers to a targeting segment based on a match between one or more segment characteristics associated with the targeting segment and one or more respective user characteristics attributed to the anonymous user identifiers based on previous activity;

request, from content delivery system, an anonymous segment identifier for anonymously identifying the targeting segment, the anonymous segment identifier being requested by the server associated with at least one organization without revealing, to the content delivery system, a segment identity of the targeting segment, the one or more respective user characteristics, or the one or more segment characteristics;

receive, from the content delivery system, the anonymous segment identifier;

associate the anonymous segment identifier with the anonymous user identifiers mapped to the targeting segment, to yield an anonymous targeting segment;

send, to the content delivery system, the anonymous targeting segment comprising the anonymous segment identifier and the anonymous user identifiers, wherein the anonymous targeting segment masks from the content delivery system both the respective identity of the respective users and the segment identity of the targeting segment; and send, to the content delivery system, an instruction to deliver media content to one or more of the respective client computing devices associated with at least one of the anonymous user identifiers in the anonymous targeting segment.

20. The non-transitory computer-readable storage medium of claim 19, wherein the media content is selected for targeting based on the one or more segment characteristics.

21. The non-transitory computer-readable storage medium of claim 19, wherein the anonymous user identifiers comprise randomly-generated identifiers and are different than a respective device identifier or a respective user account identifier.

22. The non-transitory computer-readable storage medium of claim 21, wherein the request is sent in response to a triggering event, and wherein the triggering event comprises at least one of a user action, a date, a time, a user location, a user context, an estimated interest, or a campaign.

23. The non-transitory computer-readable storage medium of claim 22, wherein the user action comprises at least one of a view, a click, a gesture, an input, or a command.

24. The non-transitory computer-readable storage medium of claim 19, wherein the mapping and the associating further comprises:

identifying customers of the at least one organization;

analyzing a purchasing history of the customers, the purchase history being associated with the previous activity;

based on the analyzing of the purchasing history of the customers, identifying and generating targeting user segments; and associating the targeting segment with the anonymous segment identifier.

25. The non-transitory computer-readable storage medium of claim 19, wherein the anonymous targeting segment is sent to the content delivery system without information identifying the one or more characteristics associated with the targeting segment, the segment identity associated with the targeting segment, the respective user identity, or a respective user account associated with the anonymous user identifiers.

* * * * *